(No Model.) 2 Sheets—Sheet 1.
P. F. GIBBONS & E. BUCHANAN.
METHOD OF ARTIFICIALLY ENRICHING CHEESE.
No. 515,523. Patented Feb. 27, 1894.
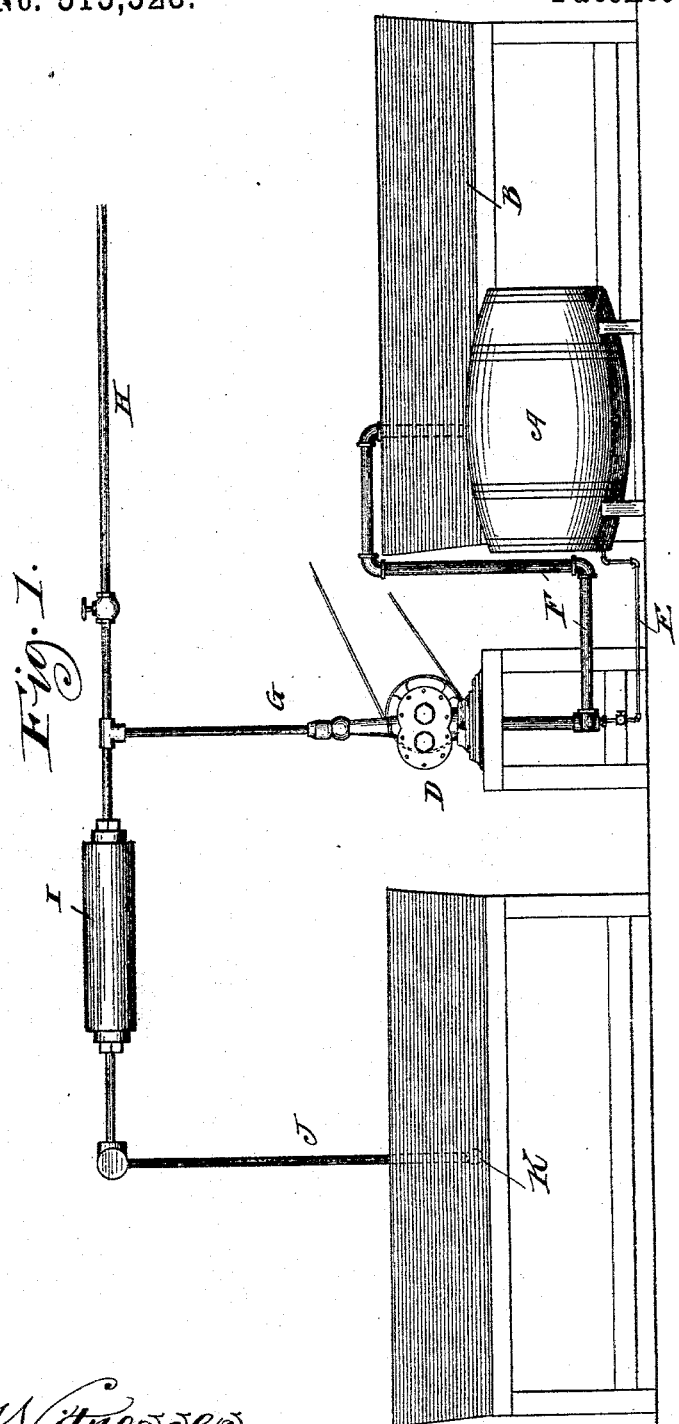
Witnesses,
J. B. Mann,
F. B. Goodwin
Inventors
Pierce F. Gibbons
Edwin Buchanan
By Offield, Towle & Linthicum
Attys
THE NATIONAL LITHOGRAPHING COMPANY,
WASHINGTON, D. C.

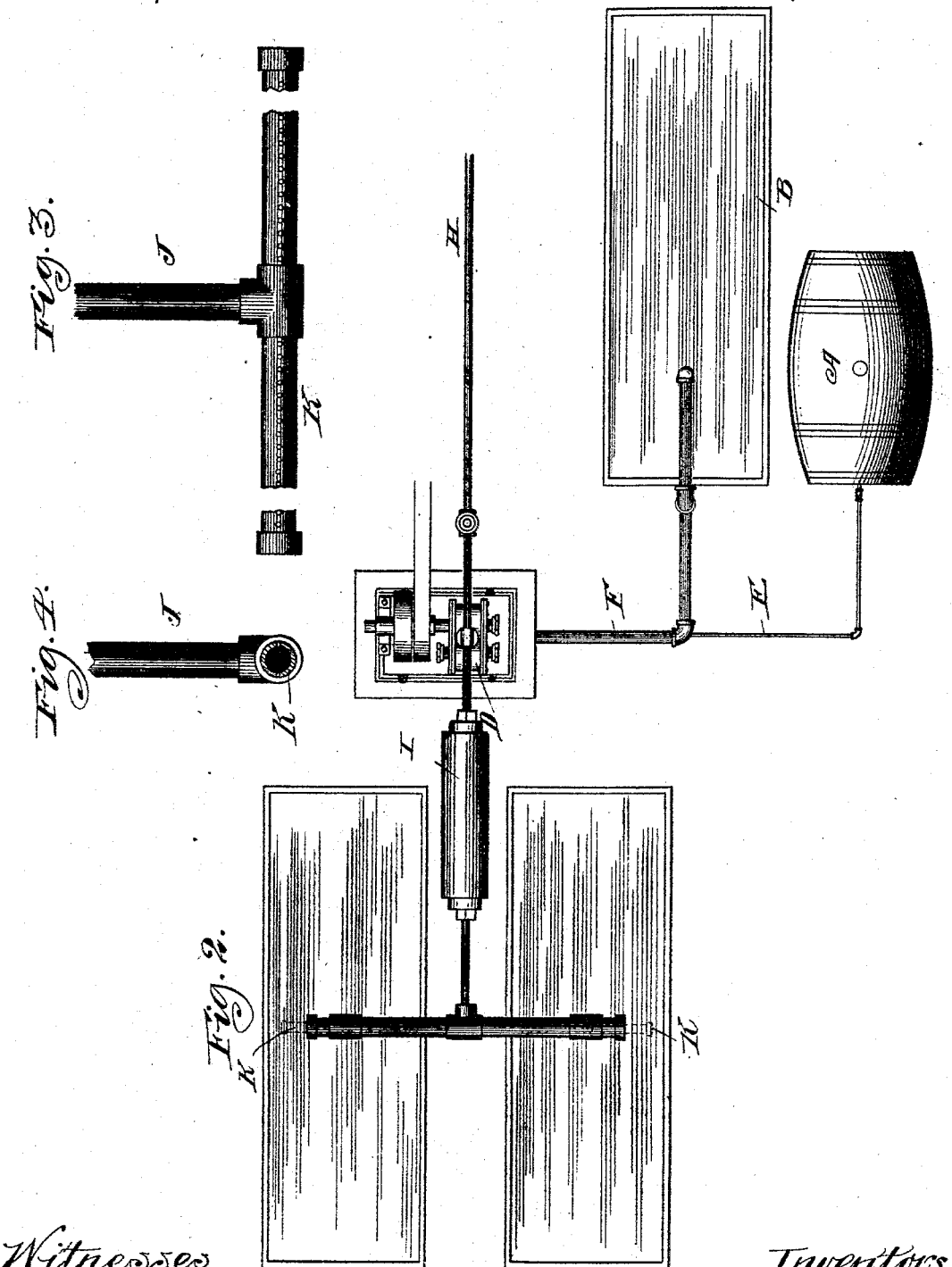

UNITED STATES PATENT OFFICE.

PIERCE F. GIBBONS, OF OAK PARK, AND EDWIN BUCHANAN, OF HEBRON, ILLINOIS, ASSIGNORS TO D. H. BURRELL & CO., OF LITTLE FALLS, NEW YORK.

METHOD OF ARTIFICIALLY ENRICHING CHEESE.

SPECIFICATION forming part of Letters Patent No. 515,523, dated February 27, 1894.

Application filed July 19, 1892. Serial No. 440,468. (No model.)

*To all whom it may concern:*

Be it known that we, PIERCE F. GIBBONS, of Oak Park, in the county of Cook, and EDWIN BUCHANAN, of Hebron, in the county of McHenry, State of Illinois, have invented certain new and useful Improvements in Apparatus for and Methods of Artificially Enriching Cheese, of which the following is a specification.

It has long been common in the manufacture of cheese to use skim-milk artificially enriched by the addition of vegetable or animal oils, and the method most commonly practiced at the present time for the incorporation of the oleaginous material with the skim-milk is to prepare an emulsion of milk and a suitable animal or vegetable oil, the ingredients most commonly used being skim-milk and a neutral lard which are mixed or blended mechanically by an emulsion machine, and in some instances the milk and oil have been commingled by the action of a steam jet. In the use of an emulsion machine, no means have heretofore been employed by which the emulsion could be injected directly into the milk without separate handling, and the steam jet when used is incapable of drawing the oil and the milk with which it is mixed to form the emulsion, from a distance, as the injector is necessarily of very limited power.

Our invention has for its object to provide an improved method whereby the ingredients employed to artificially enrich cheese are thoroughly or intimately commingled and the oleaginous material so finely and evenly divided that its particles have not sufficient buoyancy to rise to the surface of the milk when added thereto. This we accomplish by mechanically mixing the oleaginous material and the milk or its derivatives in a pump and we supplement this mechanical mixing by subjecting the ingredients to the action of a steam jet, after they are mixed in the pump chamber. The preferred method involves the use of an apparatus comprising a suitable pump, a pipe or pipes leading to separate receptacles for the oleaginous material, say oil or lard, and the milk, and an injector device to deliver a jet of steam into the delivery passage of the pump. We also preferably employ at the end of the passage from the injector a perforated pipe so as to evenly divide or separate the mixture into a number of fine streams or sprays. The oil (*e. g.* a neutral lard) is maintained in a fluid condition in its receptacle and the milk may be either cold or warm as desired. In this preferred method the first action is that of the pump, the oil and milk being drawn into the pump chamber through a single passage or through connections between the pump chamber and the receptacles for the lard and milk entirely separate. In the pump chamber the two ingredients are first mechanically mixed and after passing from the pump they are atomized by the jet of steam and forced into the vat through the apertures of the delivery pipe, the jet serving not only as a carrier of the mixture, but also serving to further commingle and blend the ingredients, and the emulsion thus formed finally issues into the body of milk in the form of a spray.

Cheese made by our method is equal in richness and flavor to full cream cheese and quite as nutritious, while it can be sold for much less. The proportions of the several ingredients which go to make up the cheese will be left to the judgment of the manufacturer, but we have commonly used said ingredients in about the following proportions: To one hundred pounds of milk we add one and one-half pounds of a neutral lard and one-half pound of cotton seed oil, and inject with the oil a suitable quantity of milk to take up and thoroughly blend with the fatty particles. We have found that by using a pump having an oil inlet pipe with a quarter inch internal diameter or bore and a milk inlet having a bore of one inch, the proper portions of each are taken in and good results are secured.

In the accompanying drawings: Figure 1 is a view in side elevation showing the oil and milk receptacle, the cheese vat, the pump and the steam injector. Fig. 2 is a plan view of the same; and Figs. 3 and 4 are views of the perforated delivery pipe.

In said drawings, A represents a receptacle or tank for the melted lard to which may be added cotton seed oil, or other suitable animal or vegetable oils, singly or mixed.

B represents the tank to contain a suitable quantity of milk, skim milk or butter milk. D represents a rotary pump of well known construction, but any other suitable lifting or forcing pump may be employed in lieu thereof.

E represents a pipe communicating with the pump chamber and with the oil receptacle, and F a pipe communicating with the milk receptacle.

G is a pipe leading from the pump chamber, and H a pipe leading from the steam dome of a boiler and which delivers into pipe G. The pipe G has an enlargement forming an atomizing chamber I, and beyond this chamber a header from which leads one or more pipes J which dip into the vat containing the milk, from which the cheese is to be made, the pipe J preferably having on its lower end a header K consisting of a pipe with closed ends and having its sides provided with a number of minute perforations or slits for delivering the mingled ingredients in a finely divided condition and preferably in the form of a spray.

The pump draws the oil and milk from their respective vessels and produces a preliminary mixture of the ingredients by a mechanical mixing or beating action and at the same time propels the mixture or preliminary emulsion through the conduit and atomizing chamber and injects it into the body of milk or skim milk contained in the cheese vat and delivers the emulsion into that body in a finely divided state or spray whereby the emulsion is distributed through that body of liquid. The steam jet operates upon the preliminary mixture produced by the pump and atomizes the same, thereby converting it into a perfect emulsion in which the oleaginous particles are of a very small size and uniformly distributed. This action of the steam jet is facilitated by the preliminary mixing effected by the pump and by the motion which is imparted to the preliminary mixture by the pump and with which it is propelled through the atomizing chamber. We have found that this method, while much more expeditious, and therefore more economical, than methods in common use in which an emulsion is formed which is separately added to the milk, gives equally good results while the oily particles are finely, evenly and thoroughly distributed throughout the body of milk so that they do not rise to the surface, and thus we are enabled by a continuous operation to artificially enrich the cheese by withdrawing the enriching ingredients from suitable receptacles which may be entirely closed, the combined ingredients being delivered directly into the body of the milk without handling or transferring in open vessels.

A further advantage of our process, resides in the fact that we can artificially enrich cheese thereby, without heating the lard or other oleaginous material unduly, that is to say, by our process we can raise the temperature of the lard so as to render it fluid, while in producing the emulsion which has been before alluded to, it must be heated to a condition of a very thin liquor and always passes the boiling point. This overheating of the lard, as is well-known, brings out the noxious and objectionable odor therein which it is always desirable to avoid in the manufacture of cheese.

We do not limit our invention to the precise forms of apparatus and it is evident that the same mixing and forcing device can be used to inject the enriching ingredients into a number of vats or tanks simultaneously.

We claim as our invention—

1. The herein before described method of artificially enriching cheese, consisting in first making an emulsion of milk and a fluid oleaginous material by withdrawing said materials simultaneously and in the required proportions from the receptacles containing them into a pump or mixing chamber, discharging the commingled ingredients into a delivery pipe, atomizing said ingredients and finally discharging them in the form of spray into the body of the milk whereby said ingredients are withdrawn from their receptacles, mixed and discharged without separate handling, substantially as described.

2. In combination with a pump or mixing chamber, independent receptacles containing the ingredients to be mixed, conduits leading from said receptacles to the pump or mixing chamber into which the ingredients are drawn simultaneously, a discharge pipe leading from the pump and an atomizer located in said discharge pipe, substantially as described.

PIERCE F. GIBBONS.
EDWIN BUCHANAN.

Witnesses:
C. C. LINTHICUM,
N. M. BOND.